United States Patent [19]
Niwayama

[11] Patent Number: 5,485,443
[45] Date of Patent: Jan. 16, 1996

[54] RECORDING AND REPRODUCING SYSTEM

[75] Inventor: Masaki Niwayama, Hyogo, Japan

[73] Assignee: Mitsubishi Denki Kabushiki Kaisha, Japan

[21] Appl. No.: 279,903

[22] Filed: Jul. 25, 1994

Related U.S. Application Data

[63] Continuation of Ser. No. 880,164, May 6, 1992, abandoned.

[30] Foreign Application Priority Data

Jun. 19, 1991 [JP] Japan .................. 3-147205

[51] Int. Cl.⁶ .................................................. G11B 3/90
[52] U.S. Cl. .................................. 369/54; 369/84
[58] Field of Search .............................. 369/54, 53, 58, 369/84, 85, 47, 48; 360/60, 69

[56] References Cited

U.S. PATENT DOCUMENTS

| | | | |
|---|---|---|---|
| 4,682,317 | 7/1987 | Tomisawa | 369/59 |
| 4,796,247 | 1/1989 | Vogelsang | 369/44 |
| 5,105,314 | 4/1992 | Ro | 360/15 |

FOREIGN PATENT DOCUMENTS

| | | |
|---|---|---|
| 0278702 | 8/1988 | European Pat. Off. . |
| 3927384A1 | 3/1990 | Germany . |
| 62-202632 | 12/1987 | Japan . |
| 2-39323 | 3/1990 | Japan . |

Primary Examiner—Georgia Y. Epps
Assistant Examiner—P. W. Huber
Attorney, Agent, or Firm—Willian Brinks Hofer Gilson & Lione

[57] ABSTRACT

A recording and reproducing system which can automatically repair, when an abnormal condition of production occurs, the abnormal condition in a recording condition without manual operation-of an operator. When an abnormal condition of a reproduction signal from a compact disc is detected, the compact disc is reproduced again beginning with a head portion of a data block being currently reproduced or a portion immediately forwardly of such head portion, and reproduction signal then is recorded again from a head portion of a data block being currently recorded by digital signal recording and reproducing means or a portion immediately forwardly of the head portion.

5 Claims, 19 Drawing Sheets

F I G. 3

| TNO | X | MIN | SEC | FRAME | ZERO | A-MIN | A-SEC | A-FRAME |
|-----|---|-----|-----|-------|------|-------|-------|---------|

- TNO — TUNE NUMBER
- X — INDEX
- MIN/SEC/FRAME — TUNE ELAPSED TIME
- ZERO — NO DATA
- A-MIN/A-SEC/A-FRAME — TOTAL RUNNING TIME (ABSOLUTE TIME)

FIG. 19

```
                              MSB                         LSB
POSITIVE FULL SCALE         : 0 1 1 1 1 1 1 1 1 1 1 1 1 1 1 1
       (0 dB)

POSITIVE ABOUT-60dB         : 0 0 0 0 0 0 0 0 0 0 1 0 0 0 0 0

POSITIVE NO-SOUND LEVEL     : 0 0 0 0 0 0 0 0 0 0 0 0 0 0 0 0

NEGATIVE NO-SOUND LEVEL     : 1 1 1 1 1 1 1 1 1 1 1 1 1 1 1 1

NEGATIVE ABOUT-60dB         : 1 1 1 1 1 1 1 1 1 1 0 1 1 1 1 1

NEGATIVE FULL SCALE         : 1 0 0 0 0 0 0 0 0 0 0 0 0 0 0 0
       (0 dB)
```

FIG. 20

```
                              MSB                         LSB
POSITIVE FULL SCALE         : 0 1 1 1 1 1 1 1 1 1 1 1 1 1 1 1
       (0 dB)

POSITIVE ABOUT-60dB         : 0 0 0 0 0 0 0 0 0 0 1 0 0 0 0 0

POSITIVE NO-SOUND LEVEL     : 0 0 0 0 0 0 0 0 0 0 0 0 0 0 0 0

NEGATIVE NO-SOUND LEVEL     : 0 0 0 0 0 0 0 0 0 0 0 0 0 0 0 0

NEGATIVE ABOUT-60dB         : 0 0 0 0 0 0 0 0 0 0 1 0 0 0 0 0

NEGATIVE FULL SCALE         : 0 1 1 1 1 1 1 1 1 1 1 1 1 1 1 1
       (0 dB)
```

RECORDING AND REPRODUCING SYSTEM

This application is a continuation of application Ser. No. 07/880,164, filed May 6, 1992, now abandoned.

BACKGROUND OF THE INVENTION

1. Field of the Invention

This invention relates to a recording and reproducing system wherein a reproduction signal outputted from a compact disc reproducing section is recorded by a digital signal recording and reproducing section.

2. Description of the Prior Art

Ordinary analog audio apparatus such as, for example, cassette tape players are low in fidelity in recording and reproduction of sound, and when a temperature variation occurs with them or vibrations are applied to them, an increase in wow and flutter or a variation in reproducing speed occurs with them, which deteriorates the quality of a reproduction signal of them more or less.

On the other hand, digital-signal recording and reproducing apparatus as represented by compact disc players and digital audio tape recorders are designed principally for an audio signal and record and reproduce an audio signal in the form of a digital signal, and are very high in fidelity. Further, an error of a signal arising from a record medium itself or an error occurring at reading means is corrected by mighty error correcting processing, and the quality of a reproduction signal is deteriorated seldom with such digital signal recording and reproducing apparatus. Besides, wow and flutter upon reading is absorbed completely by storing data, which include such wow and flutter, once into a memory and then reading out them at a fixed rate.

Since a digital audio apparatus does not exhibit an influence thereupon of severe environment within a particular range, the superior characteristics described above are exhibited also when a reproduction signal of a digital audio signal reproducing unit is recorded by means of a digital audio signal recording unit in an automobile. In the following, description will be given of recording of a reproduction signal of a compact disc player (hereinafter referred to as CD section) by means of a digital audio signal recording and reproducing apparatus such as, for example, a digital audio tape recorder (hereinafter referred to as DAT section) in a room of a vehicle.

Referring to FIG. 17, there is shown an audio system which includes a car-carried CD section 100 and a car-carried DAT section 101 combined to each other such that an audio signal output 103 of the CD section 100 is connected to a recording signal input 104 of the DAT section 101. The CD section 100 includes a plurality of operating input keys including a CD-PLAY key 105 for instructing starting of reproduction or cancellation of a pause mode, a CD-PAUSE key 106 for instructing temporary interruption of reproduction, a CD-SEARCH key 107 for instructing heading of a track, and a CD-STOP key 108 for instructing stopping of reproduction. The CD section 100 has an operation panel having a disc insertion opening 109 formed therein and having a CD displaying section 110 provided thereon for displaying a time and so forth thereon.

Meanwhile, the DAT section 101 includes a plurality of operating keys including a DAT-PLAY key 111 for instructing starting of reproduction or cancellation of a recording waiting condition to start recording, a REC-PAUSE key 112 for instructing a recording waiting condition, a DAT-STOP key 113 for instructing stopping of recording or reproduction, and a DAT-SEARCH key 114 for instructing heading of a track. The DAT section 101 has an operation panel having a cassette pack insertion opening 115 therein and having a DAT displaying section 116 provided thereon for displaying a time and so forth thereon.

A recording operation is performed in the following procedure by manual operations of an operator. First, a compact disc not shown will be loaded in position into the CD section 100, and the CD-PLAY key 105 will be manually operated to instruct the CD section 100 starting of reproduction. Then, the CD-PAUSE key 106 will be manually operated, and a track the operator wants to start to record is inputted using the CD-SEARCH key 107. Consequently, the reproducing position of the CD section 100 is moved to a position near the head of the track, and then the recording and reproducing system waits in a pause condition. Then, a magnetic tape not shown will be loaded in position into the DAT section 101, and then the REC-PAUSE key 112 will be manually operated. Consequently, the trace position of the DAT section 101 automatically leaves a starting end of the tape (a leader portion of the tape) and is fed to a magnetic portion of the tape, thereby entering a recording waiting condition. Then, when the CD-PLAY key 105 of the CD section 100 and the DAT-PLAY key 111 of the DAT section 101 are manually operated substantially at the same time, the two apparatus 100 and 101 are released from the pause conditions, and the CD section 100 starts reproduction of the compact disc from the head of the track the operator wants to start to record while the DAT section 101 starts recording.

The conventional recording and reproducing system having the functions described above has such internal construction as shown in FIG. 18. Referring to FIG. 18, the CD section 100 includes a spindle motor 3 for applying turning force to a disc 2, an optical pickup 4 for reading a signal from the disc 2, and a servo circuit 5 having various servo functions necessary to read a signal and including an in-focus judging circuit 5a for judging, from an amount of returning light received from the disc 2 by the optical pickup 4, whether or not focusing servoing for the disc 2 is proceeding regularly.

The CD section 100 further includes a CD digital signal processing circuit 6 for processing a read signal. The CD digital signal processing circuit 6 includes a clock reproducing circuit 6a for reproducing bit clocks for data from a read signal, a CLV (constant linear velocity) servo circuit 6b for controlling rotation of the disc 2, a sub code demodulating circuit 6c, an EFM demodulating circuit 6d for demodulating an EFM modulated signal which is a modulating method peculiar to a compact disc, an error correcting circuit 6e, and a digital audio interface transmitting circuit 6f.

The CD section 100 further includes a CD memory 7 necessary for the temporary saving of data of the CD digital signal processing circuit 6 and the absorption of unevenness of a data reading speed, a CD operating circuit 8, a CD controlling circuit 9 for controlling operation of the entire CD section 100, and a CD voltage reduction detecting circuit 10 for checking a voltage reduction of a power supply input to the CD section 100 and for determining operation of the system from a result of the checking. The CD section 100 further includes an accessory power source 11 connected to an engine key of the vehicle, a battery power source 12 directly coupled to a battery not shown of the vehicle, a servo control line 13 for transmitting a controlling instruction to the servo circuit 5 and for monitoring an operating condition of the servo circuit 5, a CD sub code fetching line 14 for fetching sub code information therethrough, and a clock reproducing and synchronization detecting monitor line 15 for reproducing bit clocks from a read signal therethrough and further executing checking therethrough whether or not a detecting operation for a synchronizing signal is proceeding normally.

Meanwhile, the DAT section 101 includes a rotary drum and a motor 51, a pair of recording and reproducing heads 52 mounted on the rotary drum 51, a pinch roller 53, a capstan and a capstan motor 54, a DAT tape cassette 55, and a recording and reproduction amplifier circuit 56. The DAT 101 further includes a DAT digital signal processing circuit 57 which performs, upon recording, production of an error code, production of a sub code and 8–10 modulation peculiar to a DAT and performs, upon reproduction, correction of an error, demodulation of a sub code and 8–10 demodulation.

The DAT section 101 further includes a digital audio interface receiving circuit 58, an analog to digital converting circuit 59 for converting an analog signal of an analog recording source into a digital signal, a recording analog input terminal 60 for receiving an analog signal from an external analog recording source, a recording signal processing circuit 61 for selecting a digital audio interface input from the digital audio interface receiving circuit 58 or an analog input from the analog to digital converting circuit 59 and executing detection of a silence or no-sound condition, a DAT operating circuit 62, and a DAT voltage reduction detecting circuit 63 for checking a voltage reduction of a power supply input to the DAT section 101 and determining an operation of the system from a result of the checking.

The DAT section 101 further includes a DAT controlling circuit 64 for controlling operation of the entire DAT section 101, a drum capstan servo circuit 65 for controlling rotation of the rotary drum 51 and the capstan 54, a digital audio interface signal line 66, a detecting line 67 for a silence or no-sound signal detected by the recording signal processing circuit 61, a DAT sub code fetching line 68 for fetching a sub code read therethrough, and a recording sub code output line 69 for transmitting a sub code therethrough upon recording. In FIG. 14, the recording and reproducing system is shown in a condition so-called digital dubbing wherein a no-sound signal is being transmitted from the CD section 100 to the DAT section 101 by way of the digital audio interface signal line 66.

In the recording and reproducing system of the construction described above, the DAT section 101 performs, during a recording operation, recording of an audio signal and also records sub code information regarding the head or a number of a track or time. Sub code information required in the minimum for the DAT section 101 is information of the head of a track, and recording of such signal will be described below. When the CD section 100 or some other audio source is inputted to the DAT section 101, the DAT section 101 detects a change-over between tracks (track numbers) basically in accordance with either one of the following two methods.

The first one is used when a reproduction signal of the CD section 100 which is an object for recording is introduced into the DAT section 101 in a digital audio interface format specified by the Standards CP-340 of the Electronic Industrial Association of Japan (EIAJ). In case the recording source is the CD section 100, sub code information from which an interval between tracks can be detected is included in a digital signal from the CD section 100, and a change-over between tracks is detected making use of such sub code information.

The second method is used mainly when a signal of an object for recording is an analog signal or when, even if a signal of an object for recording is inputted in a digital audio interface format, either no inter track interval information is included in such signal or inter track interval information is included but is not utilized. When the DAT section 101 detects that a condition wherein the level of an audio signal is very low (i.e., silence or no-sound condition) has continued for more than a fixed period of time (for example, 2 seconds), it judges that an inter track interval is there.

The first method is performed by the digital audio interface receiving circuit 58, and a change-over between tracks thus detected by the digital audio interface receiving circuit 58 is transmitted to the DAT controlling circuit 64 by way of the no-sound detecting line 67. On the other hand, the principle of the second method of detecting a no-sound condition will be described subsequently. When a recording signal inputted to the DAT section 101 is an analog signal, the DAT section 101 PCM (pulse code modulation) converts the input recording signal finally into data of a two's complement format of 16 bits by means of the A/D converting circuit 59. In this instance, the relationship between the audio level and a digital code is such as illustrated in FIG. 19.

Now, if the columns are reversed only when the MSB of 16-bit data is equal to 1, then the relationship illustrated in FIG. 20 is obtained. The relationship thus obtained is equivalent to a result of full-wave rectifying processing of the 16-bit data. A level of an audio signal can be performed by comparing the value thus obtained with a digital value corresponding to a signal level as a threshold value for judgment of a no-sound condition by means of a digital comparator to judge a relationship in magnitude between them. For example, if the threshold signal level for no-sound judgment is about –60 dB of the full scale, then the binary value of "11111" makes the threshold value, and after all, if "1" is included in the high-order 11 columns of the data after the reversal described above, then this signifies presence of sound.

Determination of a no-sound condition is performed when the time wherein a no-sound condition is determined in the level judgment described above has continued for more than a fixed period of time. The recording signal processing circuit 61 has the function of such no-sound judgment and transmits a result of detection to the DAT controlling circuit 64 by way of the no-sound detecting line 67. When the DAT controlling circuit 64 detects, during recording, an inter track interval in accordance with either of the methods, it produces a signal for the recording sub code output line 69 so that sub code information representing the head of a track called nine second start ID may be recorded in addition to a music signal of a next piece of musing starting from the head of the track. The DAT digital signal processing circuit 57 combines the sub code information with the main recording signal.

FIG. 21 illustrates a relationship between a track number and a start ID. Meanwhile, FIG. 22 illustrates contents of an entire sub code of the DAT section 101 in which a start ID is included in a region denoted at SW1. Reference character SYNC in FIG. 22 denotes a synchronizing signal of the sub code. Such sub code is recorded, on a DAT tape, into a sub-area of a data array on a track of a tape shown in FIG. 23. An audio signal after digitalization is recorded into a main area of the track, and a tracking servo signal is recorded into an ATF area of the track. A heading operation during DAT reproduction is performed such that, while the tape is being fed fast, a start ID is detected, and while monitoring such start ID, the tape is fed at an ordinary speed or at a speed near to such ordinary speed until the reproducing position is set to a position a little forwardly of a position where the start ID appears.

It is to be noted that description of a heading operation at the CD section 100 upon reproduction is omitted herein since various products having such function have been realized.

As described so far, it is possible even in a room of a vehicle that a reproduction signal of the CD section 100 is recorded by a digital audio signal recording apparatus represented by the DAT section 101, and the quality in recording is normally sufficiently high. However, the environment in the vehicle room may sometimes be put into a very severe condition. For example, the room temperature may drop to −25° C. or rise to 70° C., or very strong vibrations or a very strong shock may be applied. In any of those severe situations, the CD section 100 and the DAT section 101 do not always operate regularly.

As regards a temperature factor, since the operator itself is in the environment, it can predict a disabled condition of the CD section 100 or the DAT section 101 and can avoid such disabled condition or an abnormal condition during recording. However, as regards a problem of jumping of sound (displacement from a track) or a break of sound at the CD section 100 caused by vibrations or a shock, it is difficult to eliminate them completely due to the facts that they occur unexpectedly, that a condition of a road cannot be predicted readily and that, even if a road is bad, the course of travel cannot always be changed. Consequently, when recording is performed in the vehicle room by a combination of the CD section 100 and the DAT section 101 having conventional functions, an abnormal sound or an interrupted sound may be included in recorded sound due to sudden jumping of sound at the CD section 100.

Most of vehicle-carried CD players have a function that, should jumping of sound or a break of sound occur, it is detected rapidly and then the trace position is returned to a previous reproducing position or a position near such position to resume reproduction. However, the time required for such returning operation is not so short that an abnormal condition does not occur in recorded sound.

In the prior art recording and reproducing system shown in FIG. 17, when jumping of sound or a break of sound occurs, an operator itself will manually operate the CD-SEARCH key 107 and the CD-PAUSE key 106 to move the reproducing position of a CD to a head portion of a particular track and then wait there. At the DAT section 101, the DAT-STOP key 113 will be operated to cancel a recording mode once, and then the trace position will be returned to the head of a particular track among already recorded tracks and wait there for recording by operation of the DAT-SEARCH key 114 and the REC-PAUSE key 112, whereafter reproduction of the CD section 100 and recording of the DAT section 101 will be resumed by operation of the CD-PLAY key 105 and the DAT-PLAY KEY 111. The particular track in this instance may normally be a track which is currently reproduced and recorded.

While the operations described above presume at all that the operator can detect jumping of sound, if a strong shock is applied to the vehicle, then since the noise is so high that members of the vehicles may not always listen to the music, jumping of sound or an instantaneous break of sound may possibly be missed.

Meanwhile, in case an analog signal is to be recorded, or even in case a digital audio interface is to be recorded but has no inter track information, when there is a no-sound interval of a suitable length between tracks, the inter track interval detecting means functions correctly upon recording at the DAT section 101 and also a start ID is recorded correctly. However, in a particular musical medium such as, for example, an on-the-spot recorded (live recorded) musical medium, while track numbers are originally different on sub codes of a compact disc, a reproduction signal is not be interrupted also at a change-over point between tracks.

Conventionally, in the case of such a disc as described just above, while it is being recorded or after recording of all tracks is completed once, an operator must necessarily perform a manual writing operation of start IDs, and such special operation is difficult in recording in a vehicle room.

With the conventional recording and reproducing system described above, while it is possible to record a reproduction signal of a CD by means of the digital signal recording apparatus in the vehicle room, if jumping of sound should occur once during recording, then an abnormal condition of a signal recorded by jumping of sound or a break of sound cannot be repaired unless the operator operates in a procedure including many steps. Further, it is a problem for safety of driving of the vehicle that many operations for repair of an abnormal condition are called for the driver. Such problems similarly apply to conventional recording and reproducing systems for domestic use.

SUMMARY OF THE INVENTION

It is an object of the present invention to provide a recording and reproducing system which can even if there should be jumping of sound or a break of sound on the CD side while a reproduction signal of the CD is being recorded by digital signal recording and reproducing means, automatically repair an abnormal condition of the recording condition without requiring manual operation of an operator.

It is another object of the present invention to obtain a recording and reproducing system which can prevent, even when a debilitating portion between data blocks of a CD section is not in a no-sound condition, occurrence of an abnormal condition at such delimitating portion upon recording and besides can prevent semi-permanent repetitive error correcting operations upon occurrence of an abnormal condition during reproduction.

In order to attain the objects, according to the present invention, there is provided a recording and reproducing system, which comprises compact disc reproducing means for reproducing a signal recorded on a compact disc, digital signal recording and reproducing means for recording a reproduction signal from the compact disc reproducing means and reproducing the thus recorded reproduction signal, means for delimitating data blocks of the reproduction signal from the compact disc reproducing means, abnormal reproduction detecting means for detecting an abnormal condition of reproduction of a compact disc, means for causing, when an abnormal condition of reproduction is detected, the compact disc reproducing means to reproduce the compact disc beginning with a head portion of a data block being currently reproduced or a portion immediately forwardly of such start portion, and means for causing, when an abnormal condition of reproduction is detected, the digital signal recording and reproducing means to record the reproduction signal beginning with the head portion of the data block being currently recorded or beginning with a portion immediately forwardly of such start portion.

With the recording and reproducing system, if an abnormal condition of a reproduction signal of a compact disc is detected, then the compact disc reproducing means reproduces again beginning with a head portion of a data block being currently reproduced or a portion immediately forwardly of the head portion while the digital signal recording and reproducing means records the reproduction signal again beginning with a head portion of a data block being currently recorded or a portion immediately forwardly of the head portion. Consequently, a recording operation can be performed without manual operation of the operator and without causing discontinuity, foreign sound, a break of sound or the like in the signal to be recorded.

Preferably, the recording and reproducing system may further comprise no-sound detecting means for detecting, when an abnormal condition of reproduction is detected, whether or not a delimitation immediately forwardly of a data block being currently reproduced is in a no-sound condition, and means for providing, when the delimitation is not in a no-sound condition, a no-sound period to the delimitation when the reproduction signal is attempted to be reproduced again. The last-mentioned no-sound period providing means may be replaced by for providing, when the delimitation is not in a no-sound condition, a fade-in period to the delimitation upon re-reproduction when the reproduction signal is attempted to be reproduced again. With the recording and reproducing system, when an abnormal condition of reproduction is detected, it is detected whether or not a delimitation immediately forwardly of a data block of the compact disc being currently reproduced is in a no-sound condition, and in case it is not in a no-sound condition, either a no-sound period or a fade-in period is provided at the delimitation. Consequently foreign sound or a break of sound can be prevented and continuity of sound can be obtained without an unfamiliar feeling.

Preferably, the recording and reproducing system further comprises means for counting a number of times of detection of an abnormal reproduction with regard to a same data block and stopping reproducing and recording operations of the compact disc reproducing means and the digital signal recording and reproducing means when the number of times reaches a predetermined number of times, or alternatively, means for accumulating time required for detection of an abnormal condition of reproduction with regard to a same data block and stopping reproducing and recording operations of the compact disc reproducing means and the digital signal recording and reproducing means when the accumulated time reaches a predetermined period of time. With the recording and reproducing system, reproducing and recording operations are stopped when the number of times of or an accumulated time for detection of an abnormal condition of reproduction with regard to the same data block of the compact disc reaches the predetermined number of times or the predetermined period of time. Consequently, recording and reproducing operations can be prevented from being performed repetitively and semi-permanently.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 3 is a schematic illustration showing recorded contents of a sub code of a compact disc;

Figure 1:
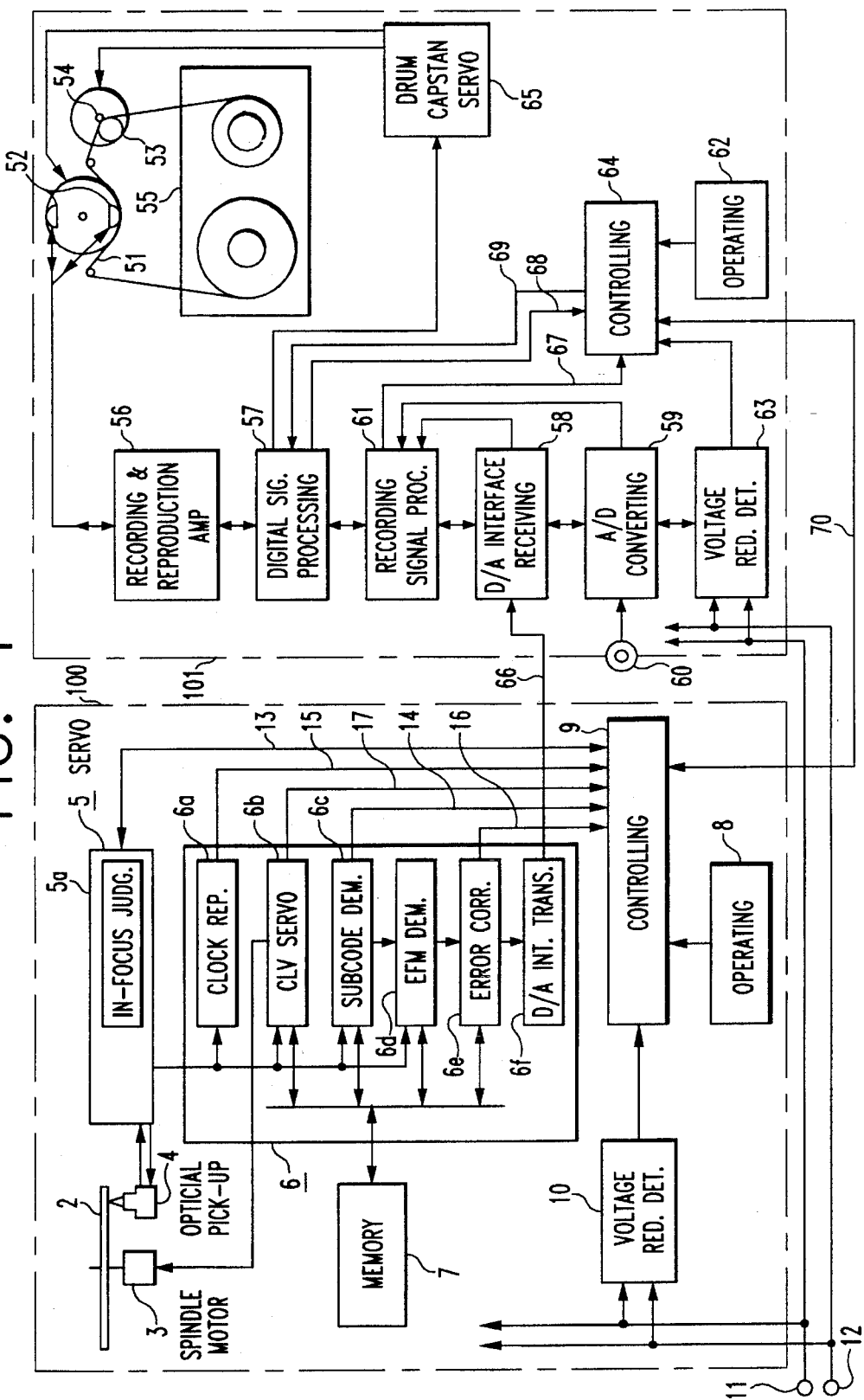
FIG. 1 is a block diagram of a recording and reproducing system showing a first preferred embodiment of the present invention.
Figure 17:
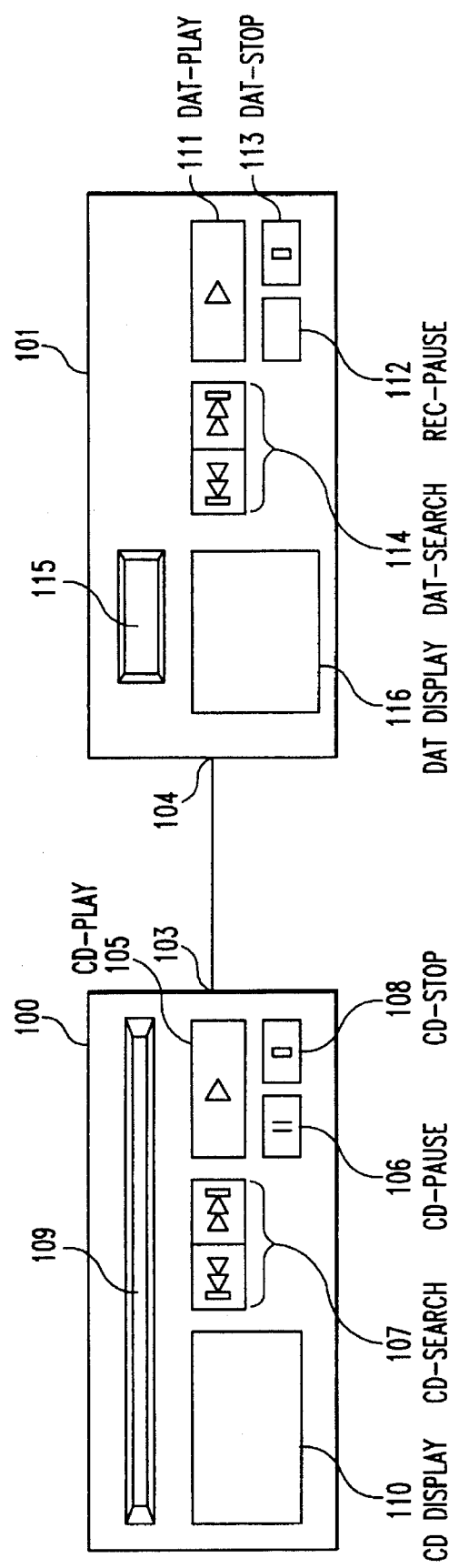
Figure 18:
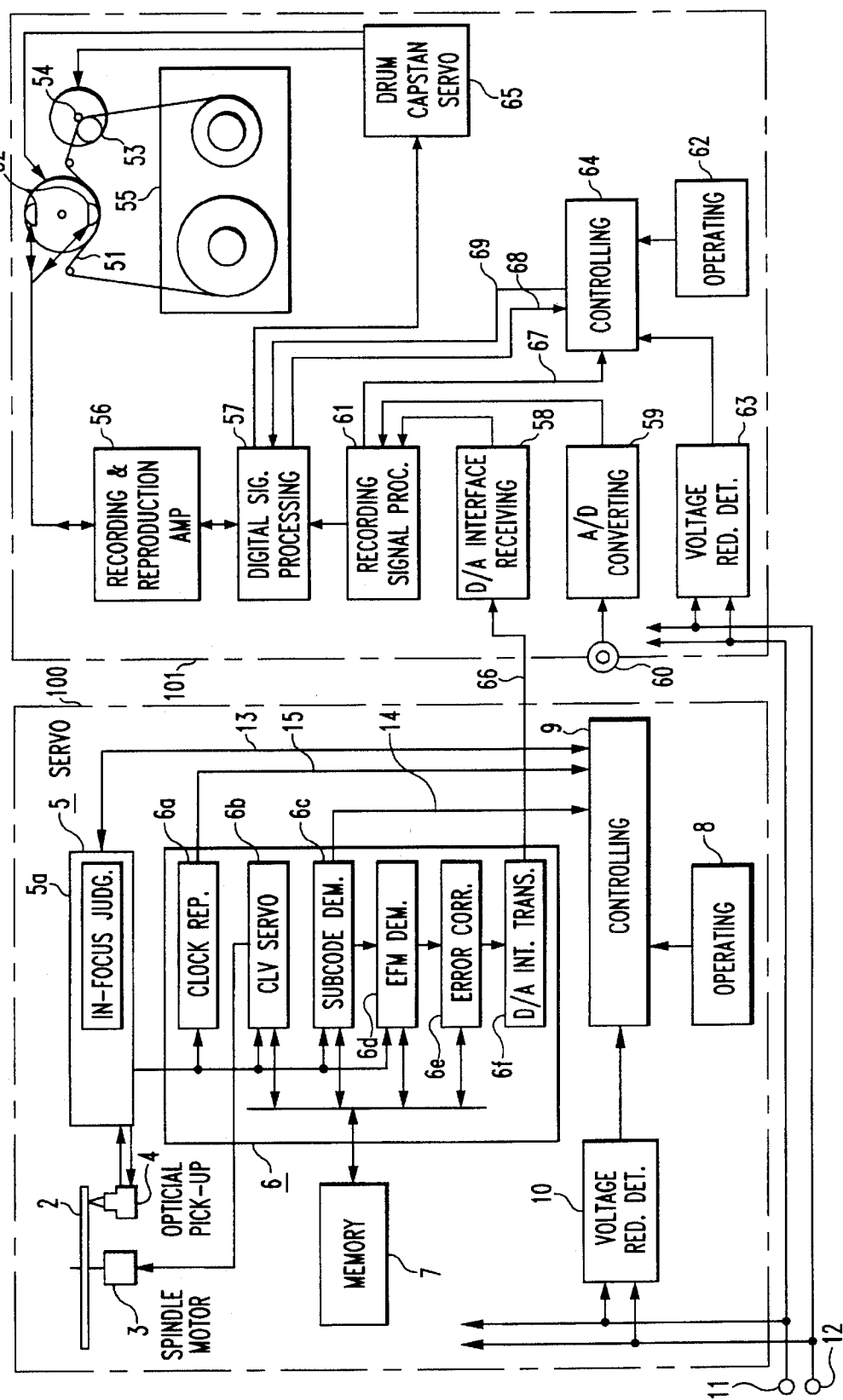
Figure 21:
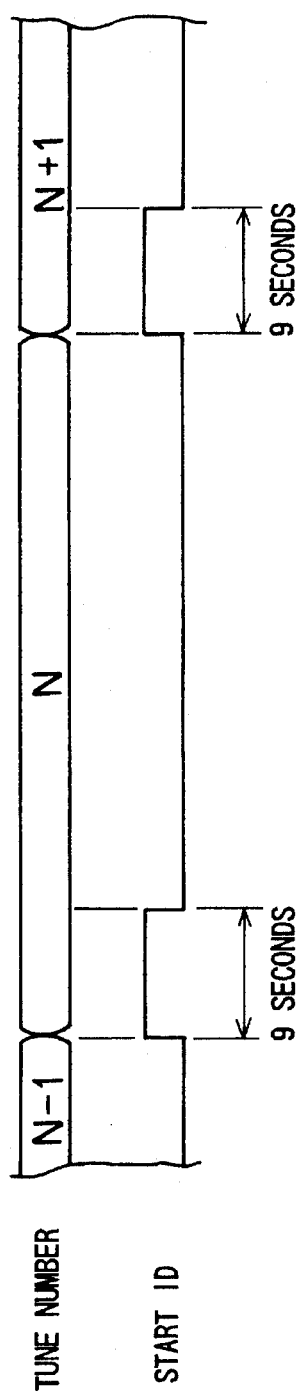

FIG: 16 is a flow chart illustrating another modified operation of the recording and reproducing system of FIG. 1;

FIG. 17 is a schematic illustration showing general construction of a conventional recording and reproducing system;

FIG. 18 is a block diagram showing more detailed construction of the recording and reproducing system of FIG. 17;

FIG. 19 is a diagrammatic view illustrating a relationship between a sound level and a digital code in the recording and reproducing system of FIG. 17;

FIG. 20 is a similar view but illustrating a relationship between the sound level and the digital code after reversal;

FIG. 21 is a time chart illustrating a relationship between a track number and a start ID at a DAT section of the recording and reproducing system of FIG. 17

Figure 22:
Figure 23:
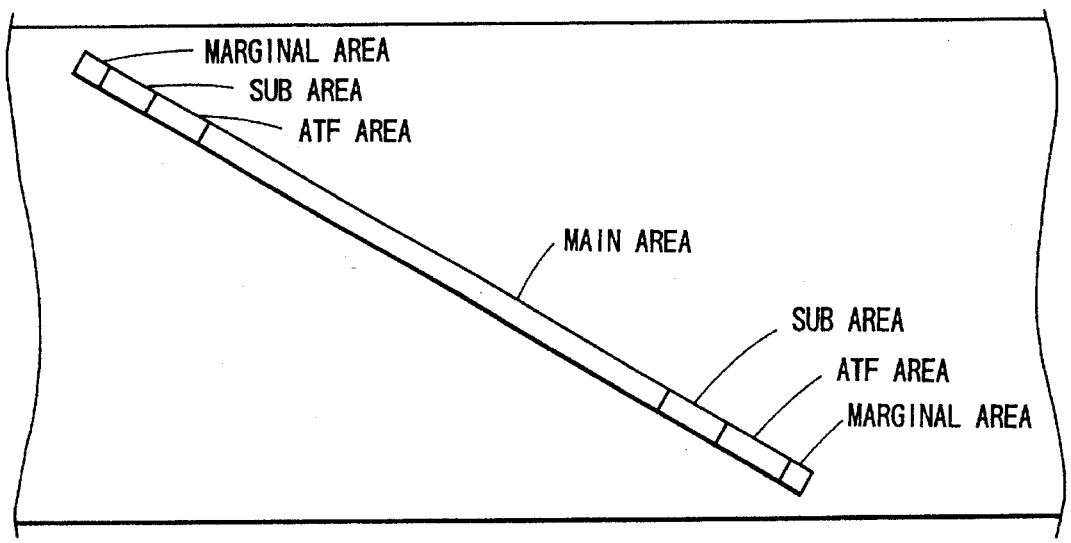

FIG. 22 is a time chart illustrating details of a sub code at the DAT section of the recording and reproducing system of FIG. 17; and FIG. 23 is a schematic illustration showing a track format of a DAT for use with the recording and reproducing system of FIG. 17.

DESCRIPTION OF THE PREFERRED EMBODIMENT

Referring first to FIG. 1, there is shown a vehicle-carried recording and reproducing system to which the present invention is applied. The recording and reproducing system has basically similar construction to that of the conventional recording and reproducing system shown in FIGS. 17 and 18, and like or corresponding elements are denoted by like reference numerals to those of FIG. 18 and overlapping description thereof is omitted herein to avoid redundancy.

The CD section 100 of the recording and reproducing system additionally includes an error monitor line 16 for transmitting therethrough a condition of an error of data detected by the error correcting circuit 6e to the CD controlling system 9, and a CLV monitor line 17 for monitoring a disc rotation servoing, that is, CLV servoing, condition. The recording and reproducing system additionally includes a two-way communication line 70 for performing communications between the CD controlling circuit 9 of the CD section 100 and the DAT controlling circuit 64 of the DAT section 101.

The recording and reproducing system of the construction described above operates in a similar manner as the conventional recording and reproducing system when it is intended to operate only the CD section 100 or the DAT section 101 to effect reproduction to listen to sound or when it is intended to operate the DAT section 101 to effect recording from a sound source other than the CD section 100. Accordingly, description of such operation is omitted herein.

The recording and reproducing system of FIG. 1 is shown in a condition wherein a reproduction signal of the CD section 100 is transmitted to the digital audio interface receiving circuit 58 of the DAT section 101 to perform digital dubbing. First, a procedure of a normal recording operation with the present recording and reproducing system will be described with reference to FIG. 2. It is to be noted that, in the following description, operation keys are described together with reference characters appearing in FIG. 17.

Figure 2:
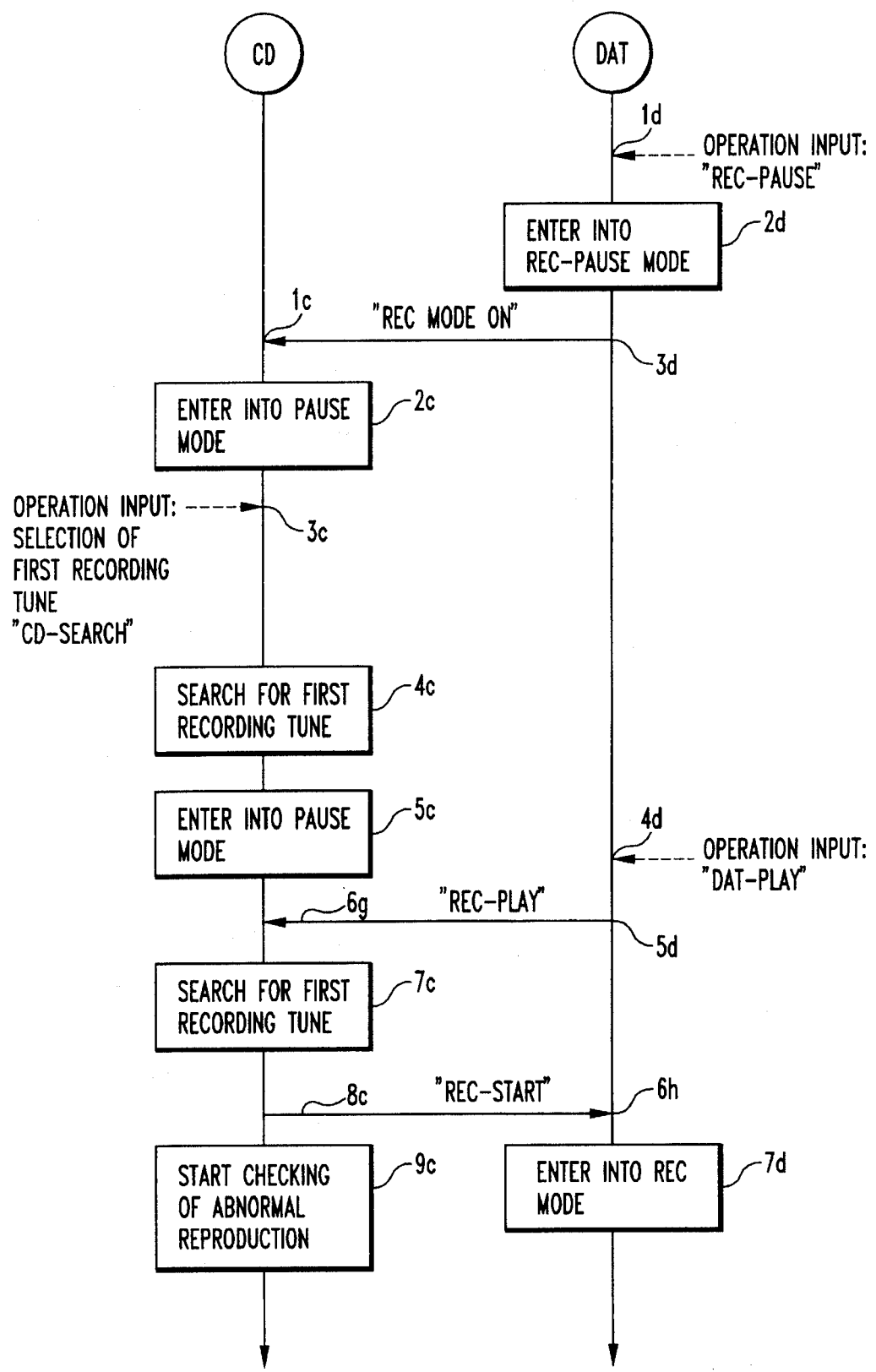
FIG. 2 is a flow diagram illustrating a communication procedure upon starting of recording of the recording and reproducing system of FIG. 1.

FIG. 2 illustrates a communication procedure between the CD section 100 and the DAT section 101 upon starting of recording, and the left-hand side flow in FIG. 2 relates to operation of the CD section 100 while the right-hand side flow shows relates to operation of the DAT section 101, and lines interconnecting them indicate contents and directions of communications between them. The communications are actually performed between the controlling circuits 9 and 64 by way of the two-way communication line Referring to FIG. 2, the REC-PAUSE key 112 is manually operated at step 1d, and in response to such operation, the DAT section 101 enters a recording pause mode at step 2d. In such recording pause mode, the components of the DAT section 101 enter into a recording mode, and the rotary drum 51 and the capstan 54 are rotated while the pitch roller 53 is held spaced apart from the capstan 54 by a pinch roller driving apparatus not shown and remains in a waiting condition so that the starting time upon starting of recording may be decreased.

After the DAT section 101 has completed its entering into a recording pause condition, a "REC MODE ON" signal instructing "to make ready for recording" is transmitted to the CD section 100 at step 3d. The CD section 100 receives such signal at step 1c, and in response to the signal, it enters into a pause mode at step 2c. In such pause mode, shifting across tracks is performed suitably so that the reproducing position may be kept at a substantially fixed position.

Then at step 3c, an instruction signal to select a first track for recording is inputted by manual operation, for example, of the CD-SEARCH key 107, and then at step 4c, the CD section 100 searches for the head of the designated track, whereafter the CD section 100 enters into a pause condition at step 5c. Meanwhile, the DAT section 101 receives, at step 4d, an input of the DAT-PLAY key 111, and transmits, at step 5d, a "REC-PLAY" signal instructing "to enter into normal play" to the CD section 100. The CD section 100 receives the signal at step 6g and searches for the first track for recording at step 7c, whereafter it enters into a normal reproducing condition. After then, at step 8c, it transmits a "REC-START" signal instructing "to start recording" to the DAT section 101.

The DAT section 101 receives the signal at step 6h and causes, at step 7d, the pinch roller 53 to be pressed against the capstan 54 to enter into a normal tape feeding mode, and after such feeding is stabilized, it executes REC mode entering processing to start actual recording. Meanwhile, the CD section 100 starts, after entering into a normal reproducing condition, a reproduction abnormal condition checking operation at step 9c. Since such reproduction abnormal condition checking operation is important, it will be described in detail below.

The reproduction abnormal condition signifies discontinuity of a reading signal caused by displacement from a track or the like or absence of a reading signal for more than a fixed period of time or occurrence of an error in data of a reproduction signal which is caused by a bad damage to or soil on a disc. As regards detection or judgment of such abnormal condition of reproduction, there are various concrete methods depending upon strictness in detection or types of abnormal conditions of objects for detection. In the following, examples of such concrete means for detecting an abnormal condition will be described. Since those means are conventionally known, only brief description thereof will be given.

The first reproduction abnormal condition detecting means relates mainly to reading of a sub code. FIG. 3 shows contents of a sub code classified as Q code in a program area of a compact disc. Such Q code includes a track number TN0, an index X, a track elapsed time MIN, SEC and FRAME, a total running time (hereinafter referred to as absolute time) A-MIN, A-SEC and A-FRAME. The times are all recorded in a resolution of a frame in a unit of 1/75 second. Such Q-code appears once per 1/75 second (once per 13 mS) if there is no error in reading of data.

Figure 4:
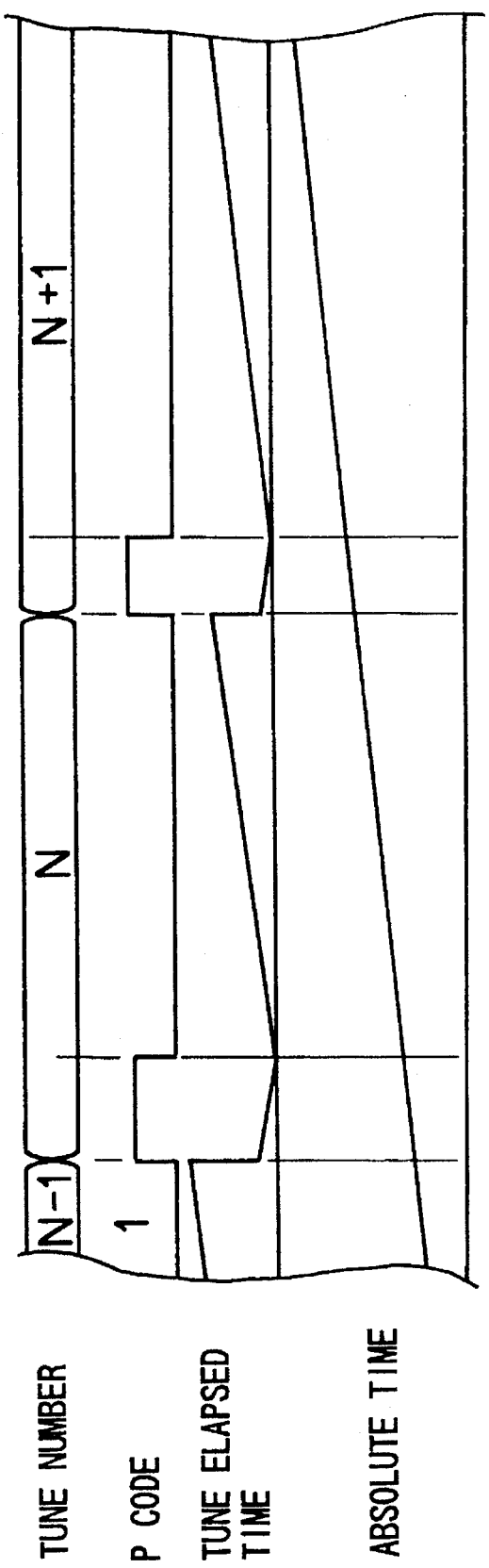
FIG. 4 is a time chart illustrating a time variation of sub code information of a compact disc.
Figure 5:
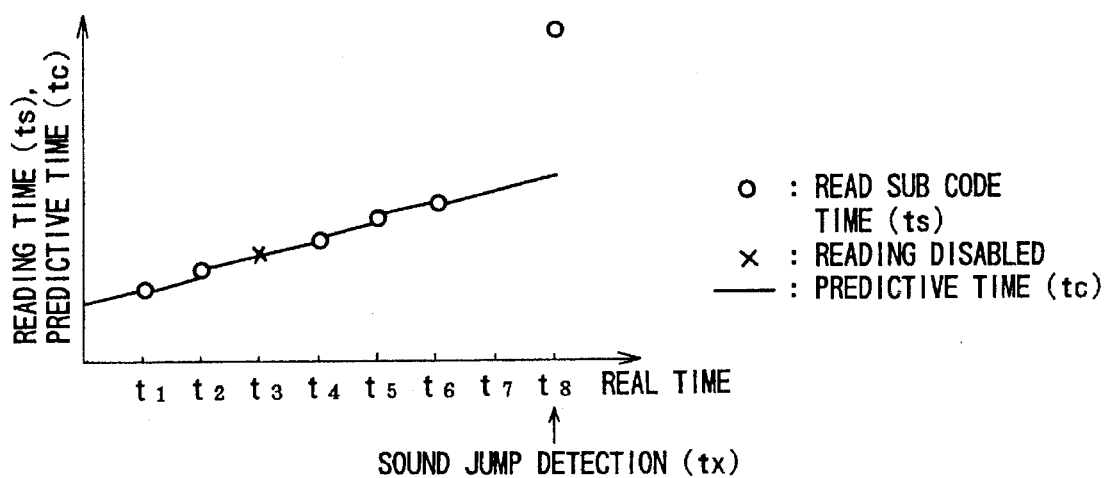
FIG. 5 is a diagram illustrating detection of an abnormal condition of reproduction using sub code information.
Figure 6:
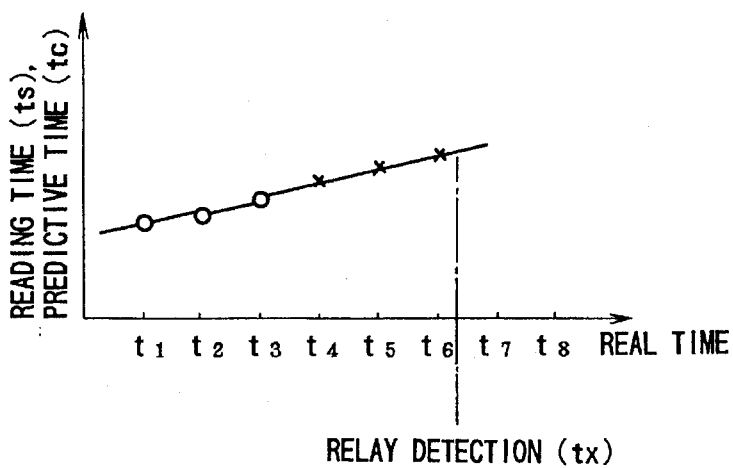
FIG. 6 is a similar view but illustrating detection of another abnormal condition of reproduction using sub code information.

FIG. 4 shows how time information of sub code information including a sub code called P code representative of an interval between tracks changes as the tracks are played in addition to the Q code. Meanwhile, FIGS. 5 and 6 illustrates how discontinuity or absence of data are detected from sub code information. In FIGS. 5 and 6, the axis of abscissa indicates a real time with a graduation of a sub code updating period (13 mS) while the axis of ordinate indicates a reading time $t_s$ obtained from a sub code and a sub code reading time the CD controlling circuit 9 predicts, that is, a predictive time $t_c$.

Now, it is assumed that track tracing is proceeding regularly and a time $\Delta t_c$ elapses in real time and besides the reading time changes by $\Delta t_s$ until a sub code is read regularly after a reading time $t_s$ was obtained at a certain timing. If reading is proceeding regularly, then either the times $\Delta t_c$ and $\Delta t_s$ are equal to each other or even if there is some difference between the times $\Delta t_c$ and $\Delta t_s$, only it must be a small difference arising from a variation in rotation of a disc or the like. On the contrary if the difference is great, this means that displacement from a track has occurred.

In the condition shown in FIG. 5, reading proceeds regularly till a timing t6, and then at another timing t8, a condition is reached wherein the difference between the predictive time $t_c$ and the reading time $t_s$ is great. Thus, it is detected at a timing $t_x$ that jumping of sound has occurred. It is to be noted that, when displacement to a neighboring track occurs with a compact disc, there is a time difference of 0.1 second or more, which is much longer than the sub code updating period of 13 mS. Accordingly, judgment of displacement of a track is effective in principle from this fact.

Meanwhile, also a condition wherein sub codes cannot be read successively is an abnormal condition of a reproducing condition. In the case shown in FIG. 6, sub codes have been read regularly till a timing t3, but no sub code is read for a particular period of time (limit time) after then. In this instance, reproduction is interrupted, that is, an abnormal condition of reproduction is judged at a timing $t_{x'}$. Such abnormal condition detecting operations as illustrated in FIGS. 5 and 6 are performed by the CD controlling circuit 9 of the CD section 100.

Figure 7:
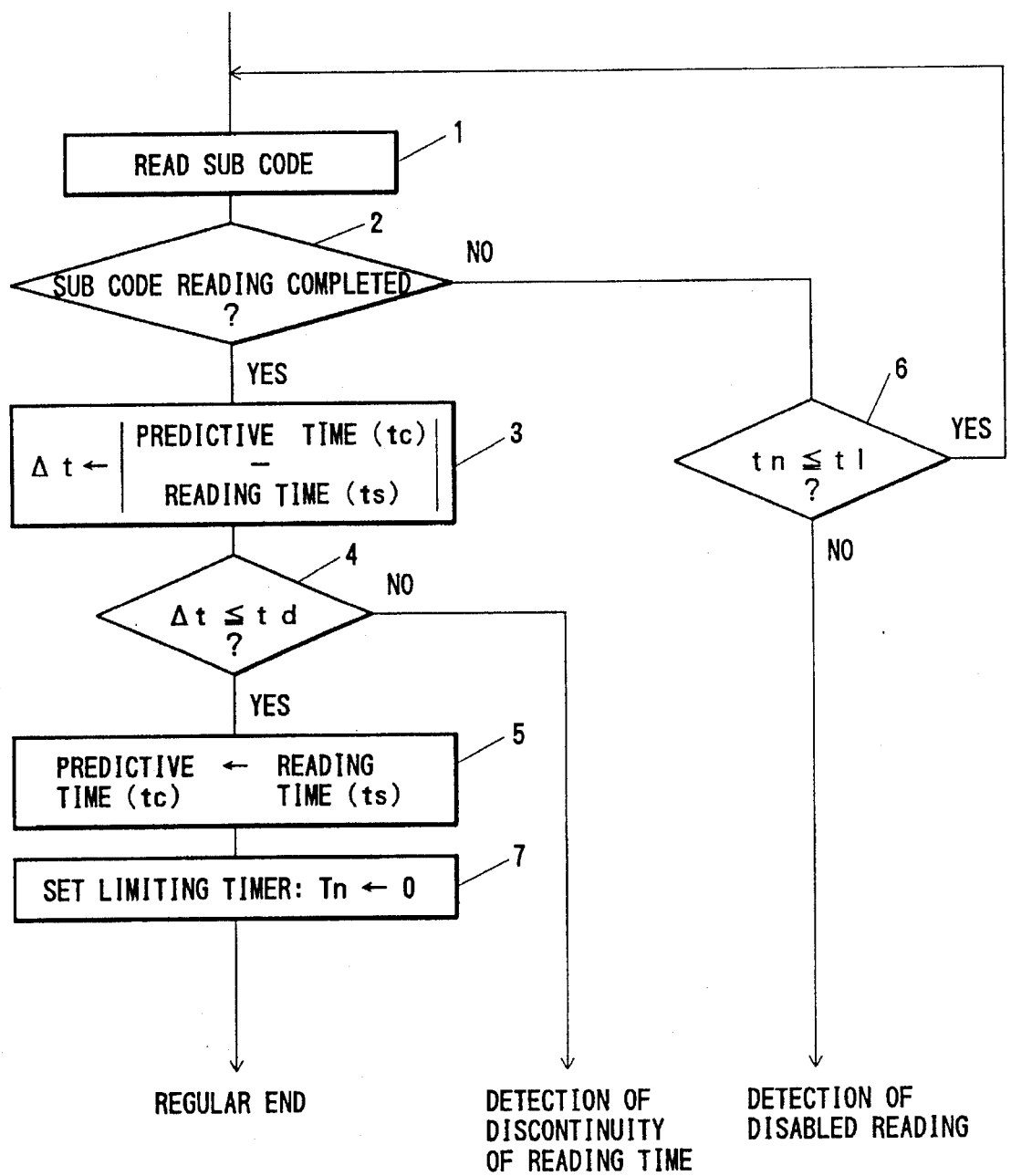
FIG. 7 is a flow chart illustrating operation of the recording and reproducing system of FIG. 1 for detection of an abnormal condition of reproduction.

FIG. 7 shows a flow chart of such abnormal condition detecting operations by the CD controlling circuit 9. Referring to FIG. 7, the CD controlling section 9 performs a sub code reading operation at step 1. In case it is judged subsequently at step 2 that reading of a sub code has completed regularly, a difference $\Delta t$ between a reading time $t_s$ (absolute time A-TIME) and a predictive time $T_c$ (calculated in advance by absolute time conversion) is calculated at step 3. At step 4, the time difference $\Delta t$ and an allowable time $t_d$ are compared with each other, and in case $\Delta t$ is longer than $t_d$, it is judged that jumping of sound has occurred thereby completing the reproduction abnormal condition checking.

In case the time difference $\Delta t$ is within the allowable range $t_d$ at step 4, it is judged that present reading of a sub code has been performed regularly or successfully, and the latest reading time $T_s$ is substituted into the predictive time $t_c$ at step 5. On the other hand, if it is judged at step 2 that sub code reading has failed, then a value of a timer $T_n$, which accumulates a time within which a new sub code is not obtained, is compared with a limit time $t_1$ at step 6, and in case the value of the timer $T_n$ exceeds the limit time $t_1$, data absence is concluded, thereby completing the reproduction abnormal condition checking. On the contrary if it is judged at step 6 that the value of the timer $T_n$ is within the limit time $t_1$, then sub code reading will be tried again.

The limiting timer $T_n$ is reset to zero at step 7 when a sub code is read regularly. It is to be noted that the limiting timer $T_n$ and the predictive time $t_c$ normally undergo time incrementing processing by processing not shown.

Subsequently, second means for detecting an abnormal condition will be described. The present means involves detection of an out-of-focus condition which is caused by strong vibrations or by a soil on or damage to a disc of a low quality. Focusing servoing, that is, focusing control executes control of literally causing the focus of reading light to coincide with a recording face of a disc, and then if reading is proceeding regularly, an amount of returning light reflected from the disc and detected by the optical pickup 4 is higher than a particular level, but if the degree of the out-of-focus condition increases, then the amount of returning light may decrease so that a correct in-focus condition cannot automatically be restored. Such condition is an out-of-focus condition, and the in-focus condition judging circuit 5a detects a focusing servoing operating condition from a level of the amount of returning light. The CD controlling circuit 9 monitors a result of judgment of the in-focus condition judging circuit 5a by way of the servo controlling line 13, and if an abnormal out-of-focus condition occurs for a fixed period of time, then the CD controlling circuit 9 determines an abnormal condition of reproduction. It is to be noted that the present means does not have the ability of detecting a sound jumping phenomenon.

Third means for detecting an abnormal condition will be described in the following. The present means involves judgment of a reproducing condition from a degree of occurrences of a condition wherein read data include so many errors that they cannot be corrected by error correcting processing. Conventionally, in error correcting processing for a compact disc, interpolating or muting processing is performed in order to reduce the level of foreign sound in sound when data which cannot be corrected are converted into an audio signal. The longer the time for which such correction cannot be performed, the more readily the resultant distortion or foreign sound on reproduced sound can be detected.

Figure 8:
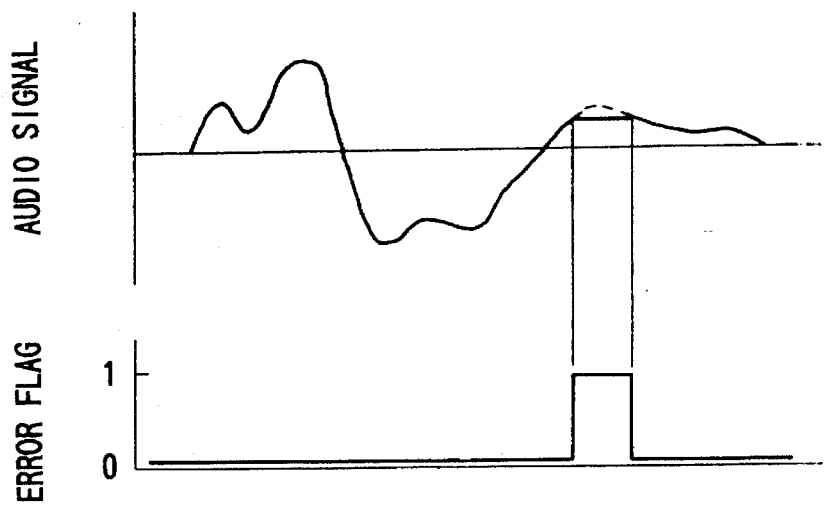
FIG. 8 is a time chart illustrating a relationship between reproduction data and a correction disabled period.
Figure 9:
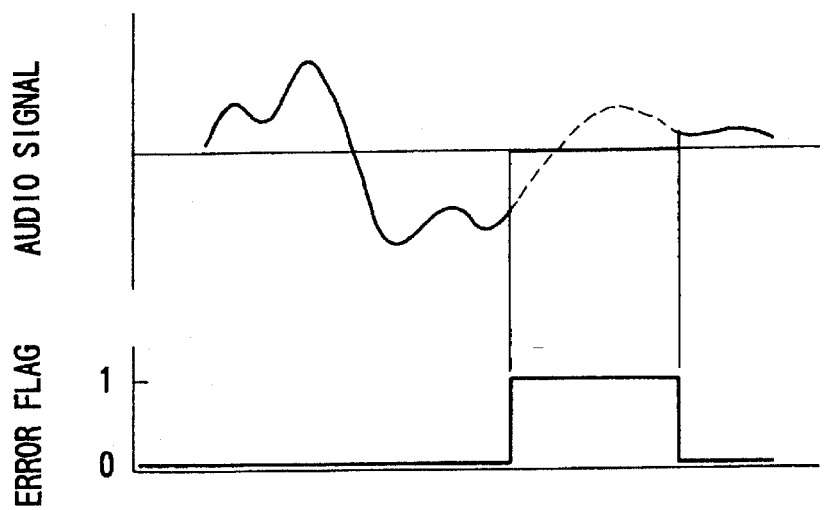
FIG. 9 is a similar view but illustrating another relationship between reproduction data and a correction disabled period.

Such relationship is illustrated in FIGS. 8 and 9. Referring to FIGS. 8 and 9, when an error flag is equal to 1, this signifies a correction disabled condition wherein read data include so many errors that they cannot be corrected by error correcting processing, and a broken line of a reproduced audio signal waveform indicates a recording source signal while a solid line indicates an actually reproduced corrected waveform. FIG. 8 shows a case wherein the correction disabled time is very short, and during such correction disabled time, average value interpolation of data is performed. Since the waveform after correction is not very different from the recording source signal, the possibility is high that foreign sound or distortion may not be recognized. FIG. 9 shows another case wherein the correction disabled time is long, and during such correction disabled time, muting is applied completely so that it is recognized as foreign sound.

Referring back to FIG. 1, the CD controlling circuit 9 fetches a signal representative of occurrence of a connection disabled condition outputted from the error correcting circuit 6e by way of the error monitor line 16, and determines an abnormal condition of reproduction when it is detected that occurrence of the correction disabled condition has continued for more than a fixed period of time. At the CD section 100, error connection is performed for a data block (one frame) for each 7.35 KHz as a unit block, and also a signal representative of an error corrected condition is updated for such period. The third means can also determine an abnormal condition of reproduction upon occurrence of jumping of sound depending upon a criterion.

Fourth means for detecting an abnormal condition of reproduction will be described below. The present means involves judgment of an abnormal condition of a reproducing operation in accordance with whether or not reproduction of bit clocks essential in digital processing of read data or operation of detecting a signal of a frame synchronizing signal (a delimitating signal between data blocks for 7.35 KHz specified in the compact disc specifications) can be performed. Reproduction of bit clocks is performed normally using PLL (phase locked loop) means not shown. Consequently, an out-of-locked condition sometimes occurs, and in this condition, processing of data is impossible at all. Further, even if reproduction of bit clocks is being performed, if a frame synchronizing signal as a delimitating signal between data blocks is not obtained, then processing of data is still impossible.

The CD controlling circuit 9 judges an abnormal condition of reproduction when PLL reproduction or detection of a frame synchronizing signal is not performed regularly for more than a fixed period of time by way of the clock reproducing and synchronization detecting monitor line 15 since foreign sound or a break of sound occurs in a reproduction signal.

Fifth means for detection of an abnormal condition will be described in the following. The present means involves detection that a memory for temporarily storing read data therein temporarily overflows or underflows to determine an abnormal condition of reproduced sound. In digital signal processing at the CD section 100, the CD memory 7 is provided for the temporary storage of read data for the convenience of processing of the data and as a data buffer for absorbing a variation or a short time deviation of a data reading speed. The CLV servo circuit 6*b* controls the speed of rotation of a disc so that a suitable amount of data may always be stored in the data buffer.

Absorption of wow and flutter of rotation of a disc is performed by s function of successively recalling the thus stored data in accordance with clocks of an accuracy of a crystal oscillator and outputting them as a reproduction signal. Due to such role of the data buffer, even if the data buffer overflows or underflows, part of the read data will be lost, which will make a cause of interruption of reproduced sound, foreign sound and discontinuity of time.

The CD controlling circuit 9 detects, from a signal of the CLV servo monitor line 19 which transmits a condition of the data buffer described above, an overflow or an underflow of the data buffer and determines an abnormal condition of reproduction. The various checking means for an abnormal condition of reproduction described so far may be used singly or in combination taking a degree of sensitivity in detection of an abnormal condition of reproduced sound or operation or the probability of wrong detection into consideration.

Figure 10:
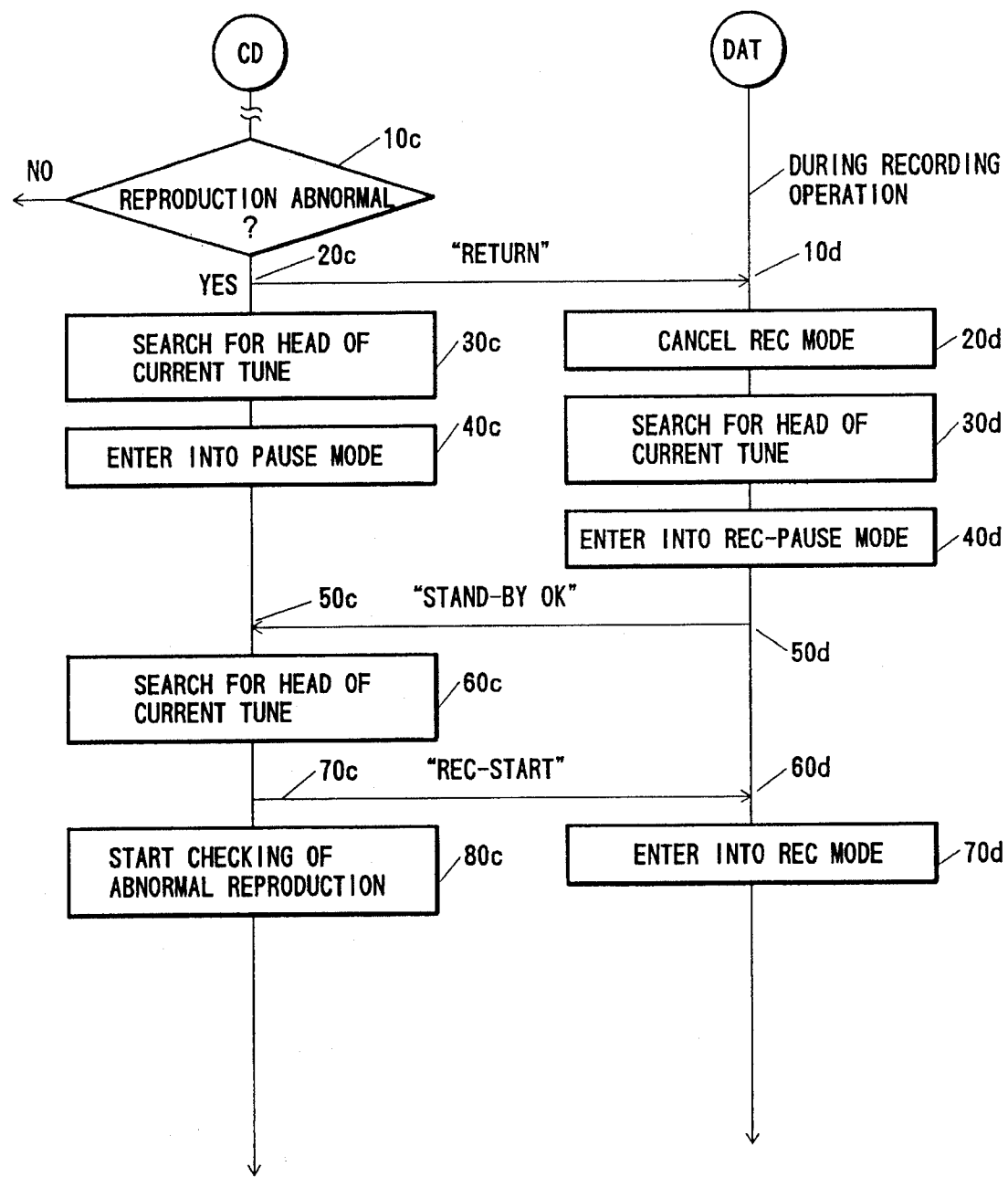
FIG. 10 is a flow diagram illustrating a communication procedure of the recording and reproducing system of FIG. 1 upon detection of an abnormal condition of reproduction.

Subsequently, processing of the recording and reproducing system of FIG. 1 when an abnormal condition of reproduction occurs during a recording operation will be described. FIG. 10 mainly illustrates a communication procedure of the CD section 100 and the DAT section 101 after starting of recording. Referring to FIG. 10, at the CD section 100, if an abnormal condition of reproduction is judged at step 10*c*, then a "RETURN" signal instructing "to return to the head of the current track" is transmitted to the DAT section 101 at step 20*c*. At step 30*c*, the CD section 100 searches for the head of the current track, and at step 40*c*, the CD section 100 enters into a pause operation. When the DAT section 101 receives the "RETURN" instruction from the CD section 100 at step 10*d*, it cancels a recording mode at step 20*d* and enters into a reproduction mode. At step 30*d*, the DAT section 101 searches for the head of the current track, and after completion of the search, the DAT section 101 enters, at step 40*d*, into a recording pause mode described hereinabove. After completion of such entering into a recording pause mode, the DAT section 101 transmits to the CD section 100 a "STAND-BY OK" signal representing "completion of preparation for re-recording" at step 50*d*.

The CD section 100 first searches, after it receives the "STAND-BY OK" signal from the DAT section 101 at step 50*c*, for the head of the current track at step 60*c* and then performs an ordinary reproducing operation. Then at step 70*c*, the CD section 100 transmits to the DAT section 101 a "REC-START" instruction instructing "to start recording" at step 70*c* and then resumes reproduction abnormal condition checking at step 80*c*. Meanwhile, the DAT section 101 cancels, when it receives the "REC-START" instruction from the CD section 100 at step 60*d*, its recording pause mode at step 70*d* and enters into a recording mode. Consequently, re-recording of the track or the data block where an abnormal condition of reproduction has occurred is performed, and if there is no abnormal condition of reproduction after then, then recording of a next track or data block is normally performed continually.

It is to be noted that, in the embodiment described above, since it is already known that a track head searching operation of the CD section 100 can be put into practice and that a current track head searching operation of the DAT section 101 can be put into practice at least if a start ID is recorded, description thereof is omitted herein.

While recording in the recording and reproducing system described above is performed again after returning to the head of a current track as a result of detection of an abnormal condition of reproduction, the interval between the current track and a preceding track does not always present a no-sound condition. For example, many music discs for which, for example, on-the-spot recording was performed do not have an interval of a no-sound condition. If continuous recording is performed at a position at which the interval is not in a no-sound condition, then discontinuity in lapse of time of recorded data likely occurs, which makes a cause of foreign sound or a break of sound upon reproduction. The recording and reproducing system may thus be modified such that it includes means for putting an audio signal at a continuously recorded portion between different tracks intentionally into a temporary no-sound condition so that foreign sound or a break of sound which is stimulus on the sense of hearing may not occur.

Figure 11:
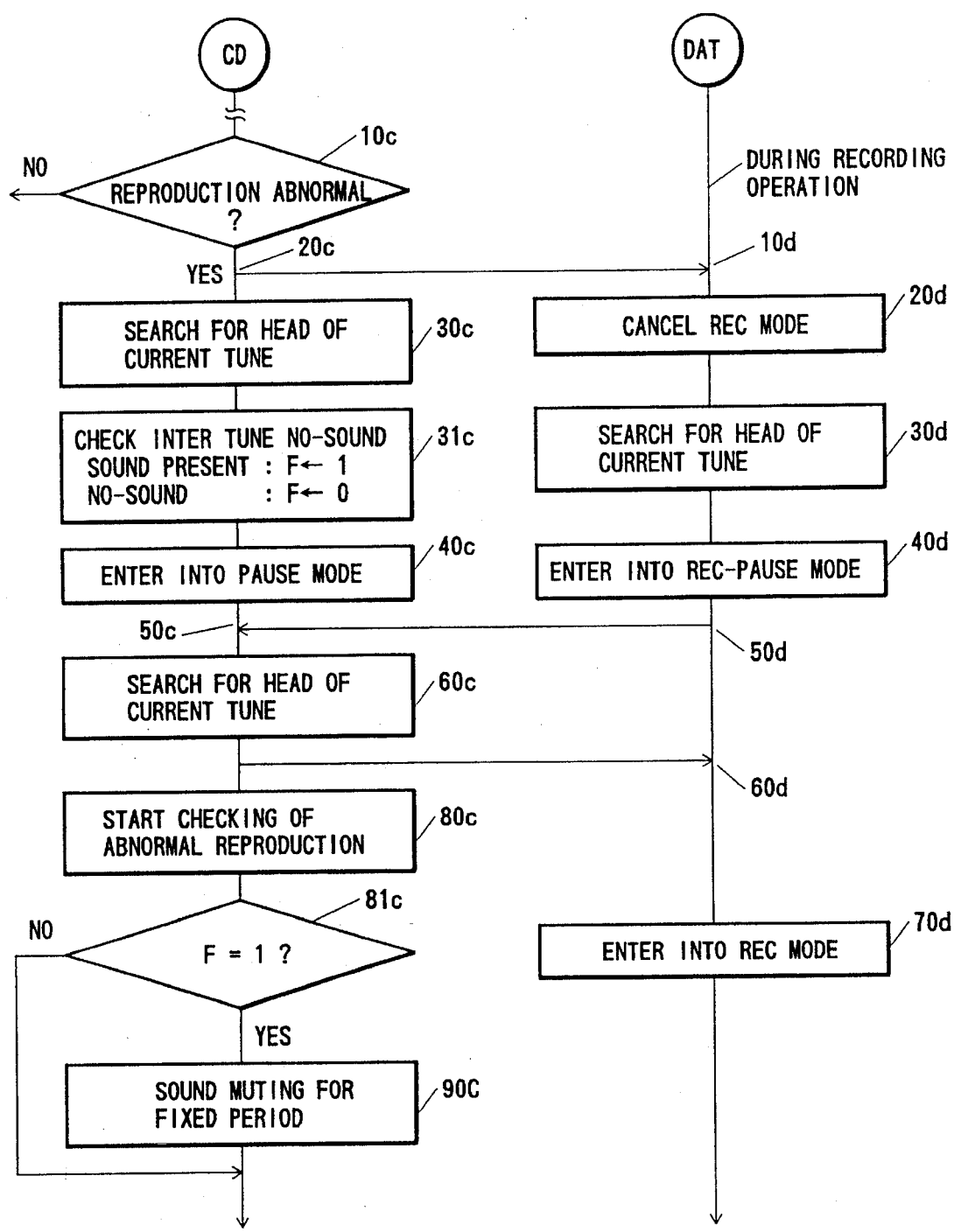
FIG. 11 is a flow diagram illustrating a modified communication procedure of the recording and reproducing system of FIG. 1 upon detection of an abnormal condition of reproduction.

In particular, the recording and reproducing system may be modified in such a manner as to apply simple muting to such continuously recording portion. In this instance, the CD controlling circuit 9 of the CD section 100 of the recording and reproducing system is modified so as to operate in the following manner. Referring to FIG. 11 which mainly illustrates a communication procedure of the CD section 100 and the DAT section 101 and in which processing of a like step number to that in FIG. 10 has same contents, the DAT section 101 operates in the same manner as in the case of FIG. 10. On the other hand, the CD section 100 performs, after performing a search for the head of a current track at step 30*c*, no-sound checking of an interval between tracks immediately forwardly of the head at step 31*c*. The no-sound checking is an operation of checking whether or not the recording sound level continues to be lower than a fixed level (normally −60 dB with respect to the full scale) over a fixed period of time (normally 2 seconds or so) of a portion forwardly of the head of a track. When a no-sound condition is detected, a flag F for storing a result of detection therein is set to 0, but it is set to 1 when presence of sound is detected.

The CD section 100 resumes reproduction abnormal condition checking for re-recording at step 80*c* and judges at step 81*c* whether or not the flag F is equal to 1, and then if the flag F is equal to 1, then the CD section 100 performs a muting operation for a fixed period of time. As a result of such processing, if the interval between tracks immediately forwardly of the track at which an abnormal condition of reproduction has occurred is not in a no-sound condition, a no-sound interval for a fixed time is provided, upon re-recording, at the head portion of the track.

In the foregoing description, it is presumed that delimitations between data blocks at the CD section 100 and the DAT section 101 coincide with each other. If they do not coincide with each other, then returning destinations for re-recording will not coincide with each other, and a result of recording will be different from a desired one. Accordingly, in case the recording signal input to the DAT section 101 is an analog signal, or even if it is a digital signal, if it does not include inter track information or even if it includes inter track information, if the DAT section 101 has no means for utilizing such inter musing piece information, then judgments of delimitations between tracks may possibly be different between the CD section 100 and the DAT section 101.

Figure 12:
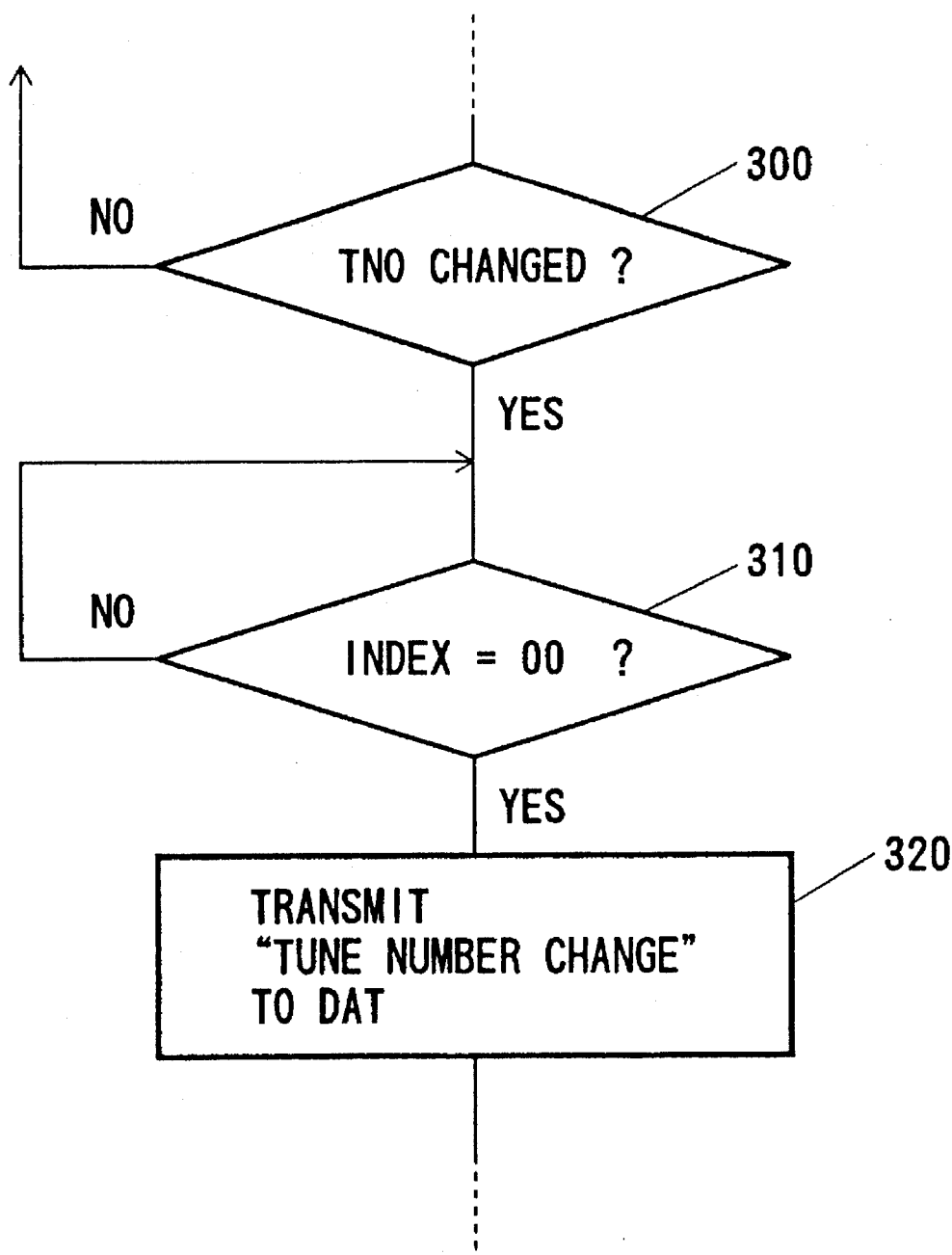
FIG. 12 is a flow chart illustrating an operation of transmitting a change of a track number at a CD section to a DAT section of the recording and reproducing system of FIG. 1.

In such a case, in order to establish interlocking and synchronization between the CD section 100 and the CD section 100 in a re-recording operation, a delimitating signal between tracks is transmitted from the CD section 100 to the DAT section 101 using the two-way communication line 70, and the DAT section 101 records a start ID based on the thus received delimitating signal. Consequently, the delimitating conditions between tracks coincide completely with each other between the CD section 100 and the DAT section 101. FIG. 12 illustrates processing of performing, in such a case, communication from a sub code read from a disc by the CD portion 100 to the DAT section 101 at the head portion of a new track.

Referring to FIG. 12, the processing is entered after a new sub code is read, and at step 300, the CD section 100 checks a change of the track number TN0 of the sub code. If there is a change of TN0, then the CD section 100 waits, at step 310, until the index X of the sub code information becomes equal to "00". When the index becomes equal to "00", this means that the current point of time is immediately after starting of the next track, and accordingly, the CD section 100 performs, at step 320, communication of "track number has changed" to the DAT section 101. Though not shown, upon reception of the communication, the DAT section 101 records a start ID for 9 seconds. Further, it is also possible to send some other sub code information of a track number in addition to the communication at step 320. In this manner, with regard to at least delimitations between tracks or data, the CD section 100 and the DAT section 101 can be constructed such that they have fully common information, and consequently, a re-recording operation can be regularly put into practice.

While the modified recording and reproducing system is designed to apply simple muting to such continuously recording portion as described above, the recording and reproducing system of FIG. 1 may be modified alternatively such that a continuously recorded portion in re-recording is not made as a mere no-sound portion for a fixed period of time, but the recording signal level is minimized once and then it is raised toward a regular level as time passes (a so-called fade-in operation is performed) so that an unfamiliar feeling may be moderated which may otherwise by caused by provision between tracks of an intentional no-sound portion which originally is not a no-sound portion.

Figure 13:
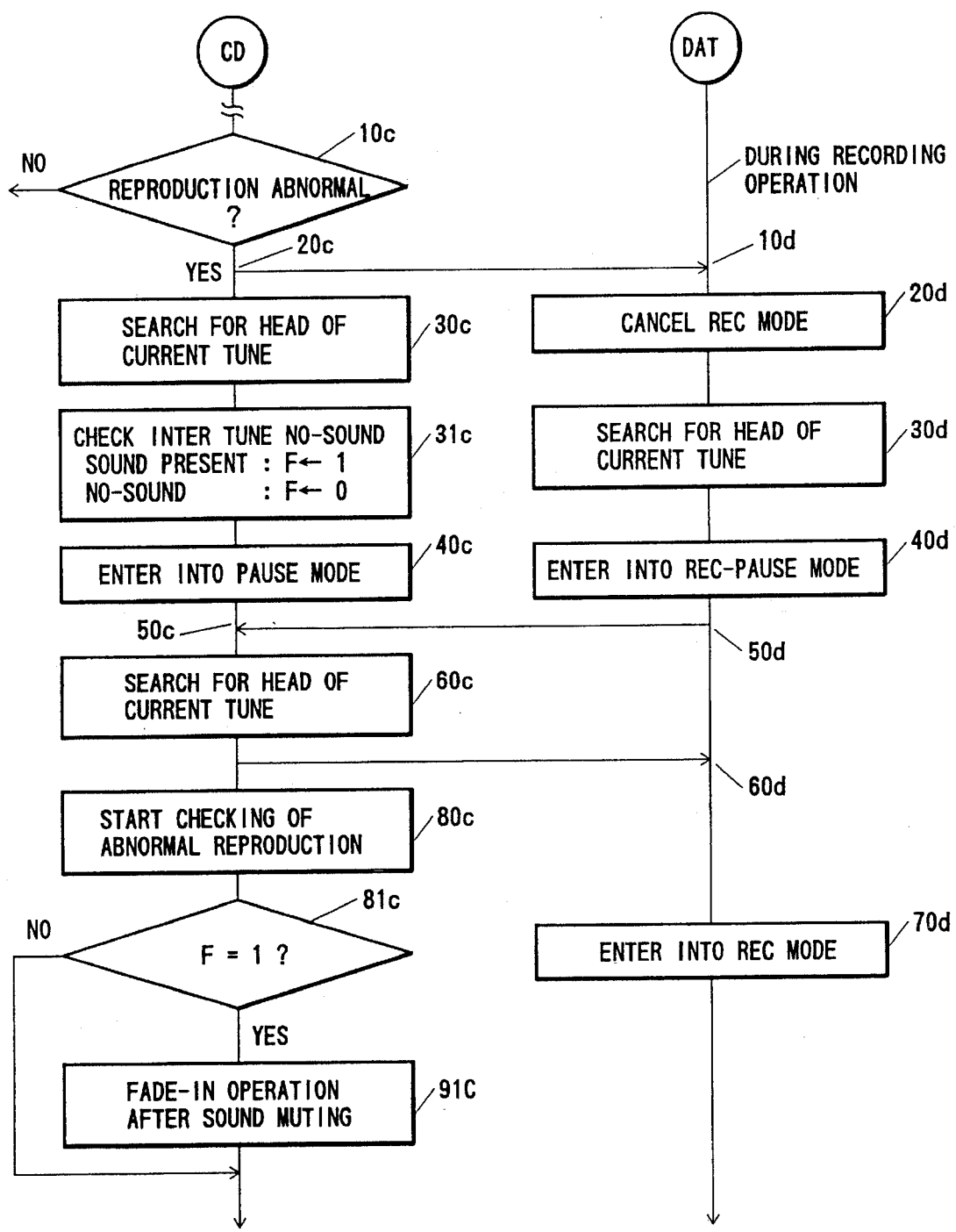
FIG. 13 is a flow diagram illustrating another modified communication procedure of the recording and reproducing system of FIG. 1 upon detection of an abnormal condition of reproduction.

A communication procedure between the CD section 100 and the DAT section 101 of the modified recording and reproducing system described just above is illustrated in FIG. 13. The communication procedure is different from that shown in FIG. 11 only in that a step 91c is provided in place of the step 90c of FIG. 11. At the alternative step 91c, sound muting and a fade-in operation after then are performed. As regards a method of putting a fade-in operation for a recording signal into practice, it can be realized, where a recording signal is an analog signal, by popular means called electronic volume means. In case a recording signal is a digital signal, a digital multiplier may be employed such that a recording signal is inputted to an input thereof while a digital coefficient defining an attenuator amount is inputted to the other input thereof so that a calculation is performed for each sampling frequency of the CD section 100 and the coefficient is increased as time passes.

Figure 14:
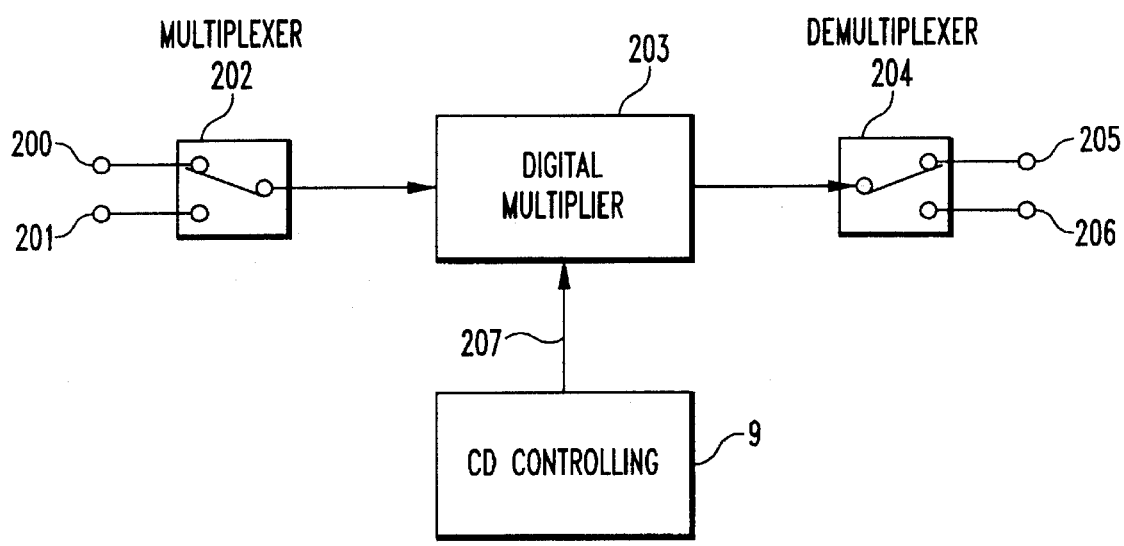
FIG. 14 is a block diagram showing a digital fade-in circuit which is used to achieve the communication procedure of FIG. 13.

FIG. 14 shows exemplary construction of such digital fade-in circuit. Referring to FIG. 14, the digital fade-in circuit shown has an L-channel recording audio signal input 200, an R-channel recording audio signal input 201, an L-channel output 205, an R-channel output 206 and a coefficient input 207 from the CD controlling circuit 9, and includes a multiplexer 202, a digital multiplier 203 and a demultiplexer 204.

The multiplexer 202 and the demultiplexer 204 are provided so as to perform calculations of sound of the L-channel and the R-channel in a time division condition on the single multiplier 203, and to enable this, the multiplier 203 executes calculations in accordance with clocks of a frequency equal to twice 44.1 KHz (the CD section 100 samples an audio signal with a frequency of 44.1 KHz). The digital fade-in circuit may be provided between the error correcting circuit 6e and the digital audio interface transmitting circuit 6f of FIG. 1. The CD controlling circuit 9 realizes a fade-in operation by setting the coefficient first to zero immediately after starting of re-recording and then varying the coefficient toward 1 as time passes.

Subsequently, description will be given of a further modification to the recording and reproducing apparatus described hereinabove with reference to FIG. 1. In case the cause of jumping of sound is a damage to or a soil on a disc, when the disc is reproduced in order to effect re-recording, jumping of sound very likely occurs at the same track. When the operator is in the room of the vehicle, it can deal with such situation, but when the operator is absent, re-recording will be attempted repetitively and hence semi-permanently, which is not preferable. The present modification provides a countermeasure for such problem and will be described with reference to the flow chart of FIG. 15 which illustrates processing of the CD controlling circuit 9 when the CD section 100 is reproducing a track to effect recording.

Figure 15:
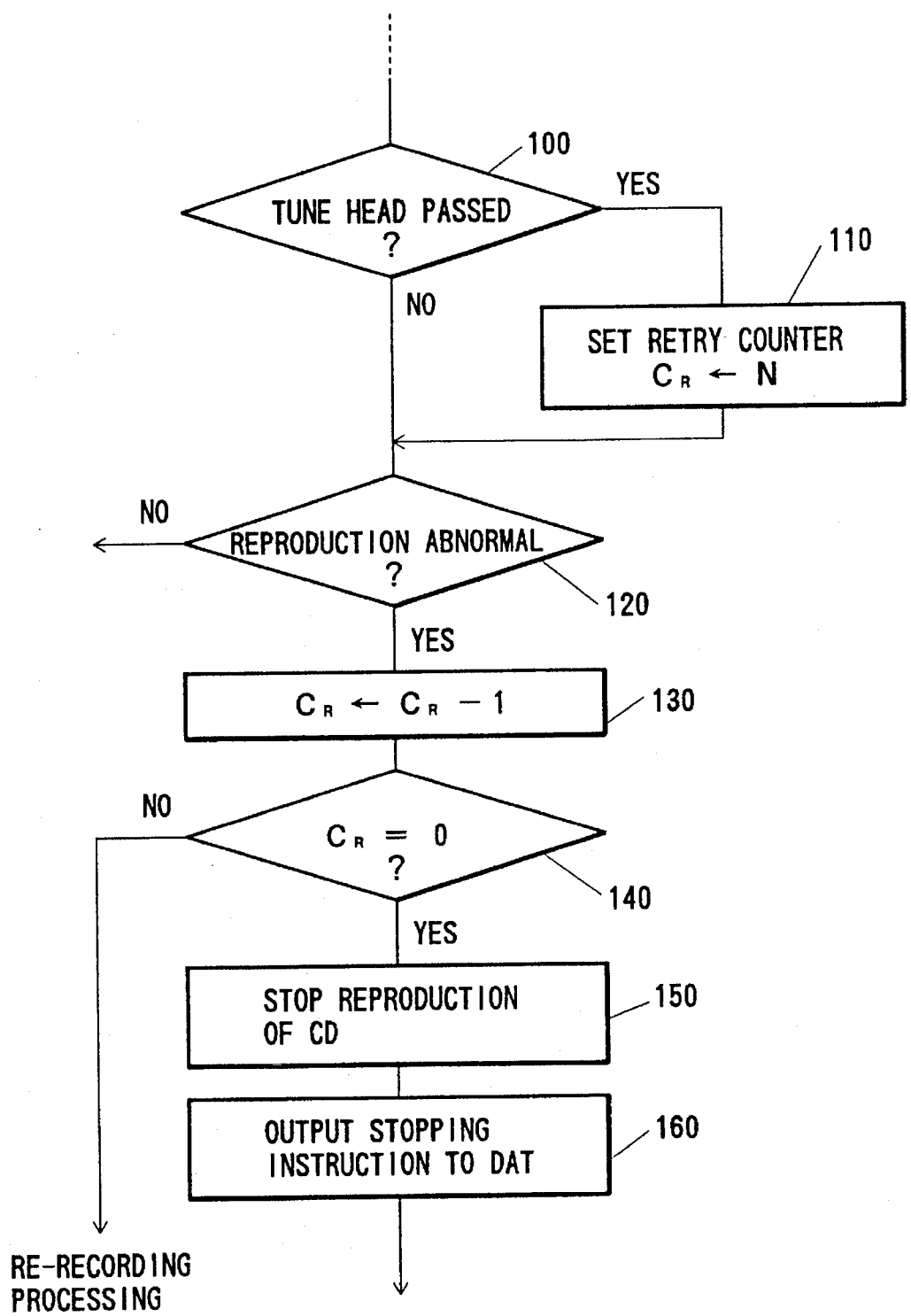
FIG. 15 is a flow chart illustrating modified operation of the recording and reproducing system of FIG. 1.

Referring to FIG. 15, when it is detected at step 100 that a track number (TN0 of a sub code) of a track to be reproduced has changed, the count value of a retry counter $C_R$ is set to N at step 110. Then, if an abnormal condition of reproduction is detected at step 120, the retry counter $C_R$ is decremented by one at step 130, and it is judged at step 140 whether or not the count value $C_R$ is equal to zero. If the count value $C_R$ is equal to zero, then this means that an abnormal condition of reproduction and a re-recording attempt have occurred by N–1 times in the past, and accordingly, the reproduction of the CD section 100 is stopped at step 150. After then, a stopping instruction is transmitted to the DAT section 101 at step 160. On the other hand, in case the count value $C_R$ is not equal to zero at step 140, the CD controlling circuit 9 enters into such a re-recording operation as illustrated in FIG. 10. In this manner, in the present modified recording and reproducing system, if an abnormal condition of reproduction is detected continuously by N times with a same track, then a recording operation of the entire system is stopped. Consequently, it is prevented that a re-recording attempt is repeated semi-permanently.

Figure 16:
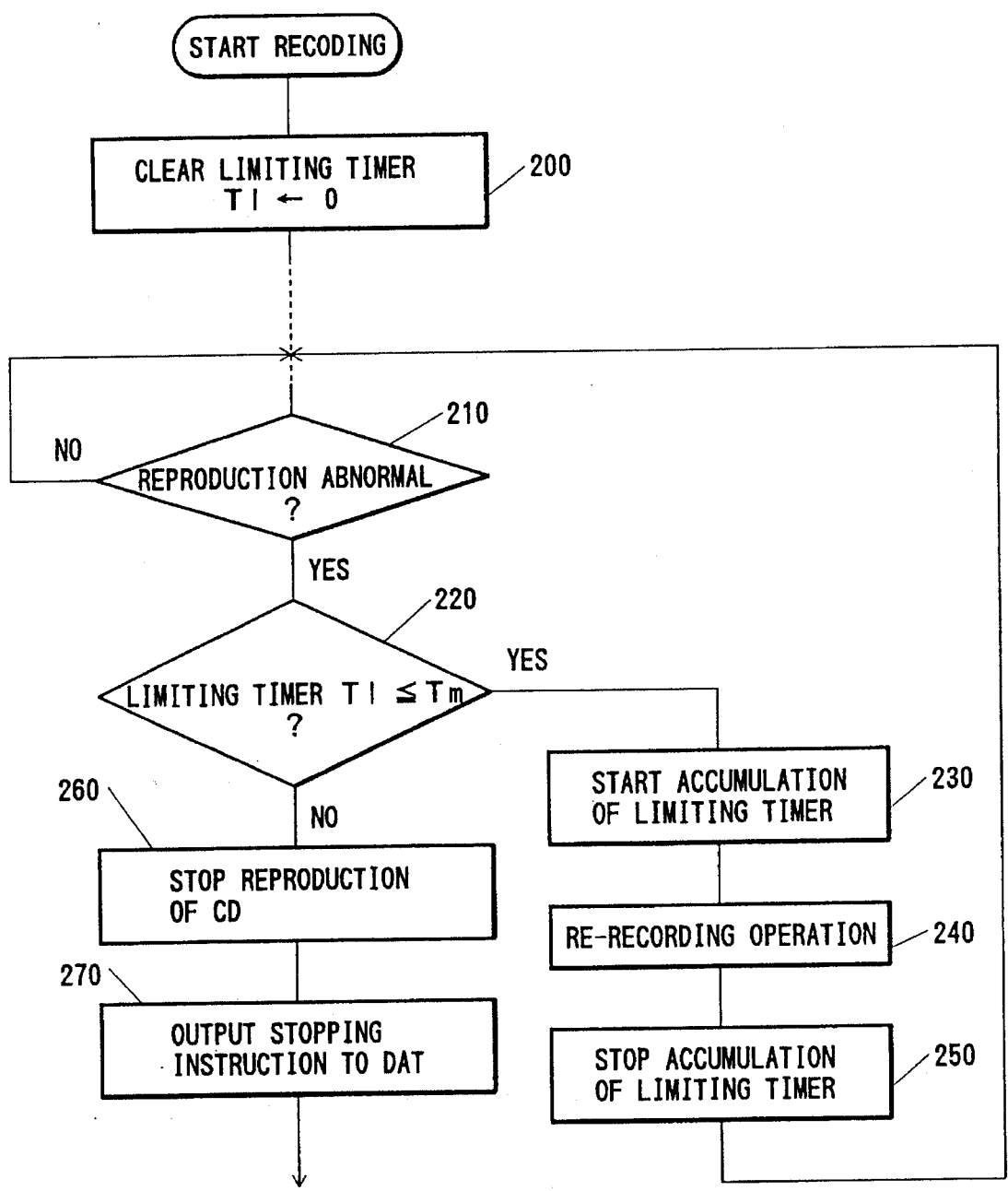

Subsequently, a yet further modification to the recording and reproducing system of FIG. 1 will be described. While it is limited also in the present modified recording and reproducing system similarly as in the preceding modified recording and reproducing system that a re-recording attempt is repeated semi-permanently, the principle of such limitation is different. FIG. 16 illustrates processing of the CD controlling circuit 9 upon recording.

Referring to FIG. 16, the step 200 is executed only once first after a recording operation is started, and at step 200, a limiting timer $T_l$ is cleared. Then, if an abnormal condition of reproduction is detected at step 210 when reproduction for recording is proceeding, it is judged at step 220 whether or not the count value of the limiting timer $T_l$ exceeds an upper limit value $T_m$. If the count value remains within the limiting time, then accumulation of the limiting timer $T_l$ is started at step 230, and a re-recording operation is performed at step 240. After the processing is completed, the accumulation of the limiting timer $T_l$ is stopped at step 250.

In case the count value of the limiting timer $T_l$ exceeds the upper limit value $T_m$ at step 220, the reproducing operation of the CD section 100 is stopped at step 260, and a stopping instruction is outputted to the DAT section 101 at step 270.

Thus, in the present modified recording and reproducing system, a time required for re-recording is accumulated by the limiting timer $T_l$, and re-recording is executed if the accumulated value is within the upper limit value, i.e., within the limiting time so as to prevent a recording operation from continuing very long. The upper limit value $T_m$ may be a fixed value independent of a time required for recording without re-recording or else may be determined with reference to a total recording time such that it may be within a half of such total recording time of a disc provided as sub code information of the disc as a recording source.

Having now fully described the invention, it will be apparent to one of ordinary skill in the art that many changes and modifications can be made thereto without departing from the spirit and scope of the invention as set forth herein.

What is claimed is:

1. A recording and reproducing system comprising:

compact disc reproducing means for reproducing a signal recorded on a compact disc in a reproduction process so as to provide a reproduction signal;

digital signal recording and reproducing means for recording the reproduction signal from said compact disc reproducing means and for reproducing the thus recorded reproduction signal;

means for separating data blocks of the reproduction signal from said compact disc reproducing means;

abnormal reproduction detecting means for detecting an abnormal condition in said reproduction signal reproduced in said reproduction process from a signal recorded on a compact disc at the compact disc reproducing means;

means for causing, when said abnormal condition is detected, said compact disc reproducing means to return to a head portion of the data block currently being reproduced or a portion immediately forward of said head portion and re-initiate reproduction of said data block; and means for causing, when said abnormal condition is detected, said digital signal recording and reproducing means to, beginning with the head portion of the data block currently being recorded or a portion immediately forward of said head portion, re-initiate recording of said reproduction signal.

2. The recording and reproducing system as claimed in claim 1, further comprising no-sound detecting means for detecting, when an abnormal condition is detected, whether or not a portion of said reproduction signal immediately forward of the data block currently being reproduced is in a no-sound condition, and means for providing, when said portion is not in a no-sound condition, a no-sound period to the portion when the reproduction of said reproduction signal is re-initiated.

3. The recording and reproducing system as claimed in claim 1, further comprising no-sound detecting means for detecting, when an abnormal condition is detected, whether or not a portion of said reproduction signal immediately forward of the data block currently being reproduced is in a no-sound condition, and means for providing, when said portion is not in a no-sound condition, a fade-in period to the portion when the reproduction of said reproduction signal is re-initiated.

4. The recording and reproducing system as claimed in claim 1, further comprising means for counting a number of times an abnormal condition is detected with regard to the same data block and stopping the reproducing and recording operations of said compact disc reproducing means and said digital signal recording and reproducing means when the number of times reaches a predetermined number.

5. The recording and reproducing system as claimed in claim 1, further comprising means for accumulating time required for detection of an abnormal condition with regard to the same data block and stopping reproducing and recording operations of said compact disc reproducing means and said digital signal recording and reproducing means when the accumulated time reaches a predetermined period of time.

* * * * *

UNITED STATES PATENT AND TRADEMARK OFFICE
CERTIFICATE OF CORRECTION

PATENT NO. : 5,485,443
DATED : January 16, 1996
INVENTOR(S) : Masaki Niwayama

It is certified that error appears in the above-indentified patent and that said Letters Patent is hereby corrected as shown below:

In col. 3, line 41, change "FIG. 14" to --FIG. 18--.

In col. 9, line 45, after "line" insert --70.--.

In col. 13, line 19, change "s" to --a--.

In col. 13, line 27, change "19" to --17--.

Signed and Sealed this

Twenty-first Day of May, 1996

*Attest:*

BRUCE LEHMAN

*Attesting Officer*    Commissioner of Patents and Trademarks